May 19, 1953
R. E. FRUSHOUR
2,638,800
TABLE OR HEAD POSITIONING ATTACHMENT
FOR DRILL PRESSES AND THE LIKE
Filed May 19, 1951
3 Sheets-Sheet 1
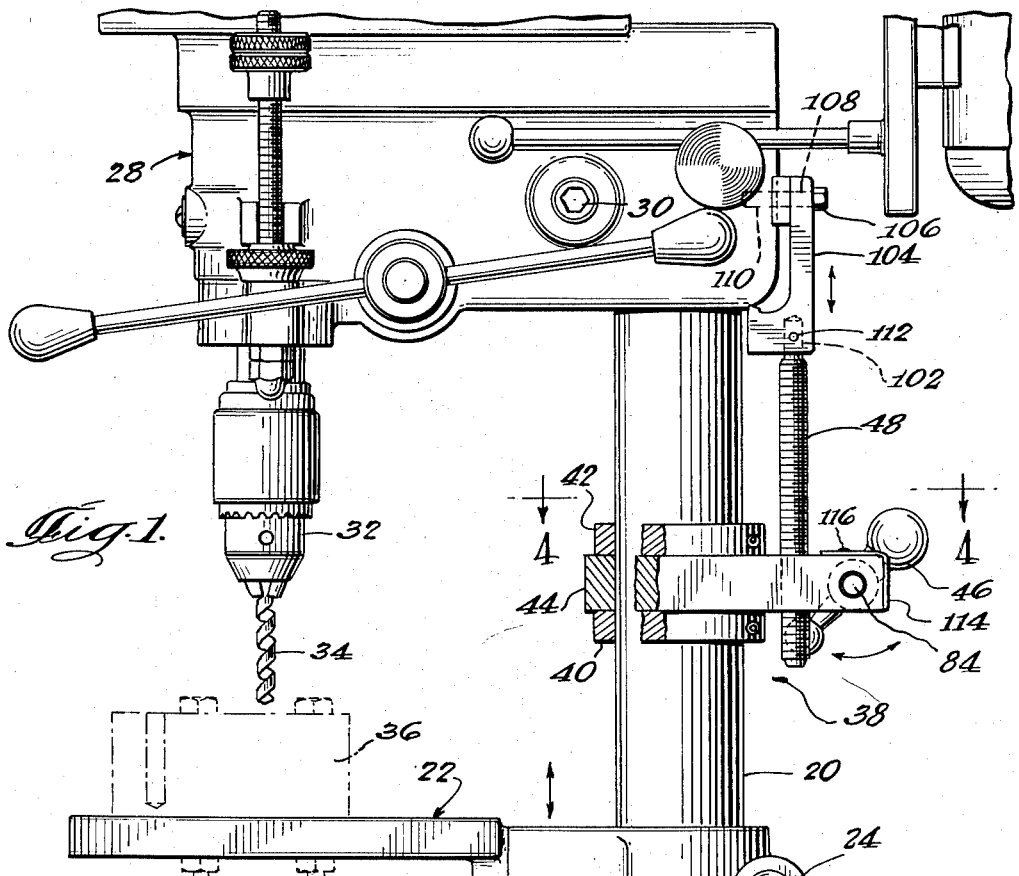
Inventor
Russel E. Frushour
By Mann, Brown & Hausmann
Attorneys

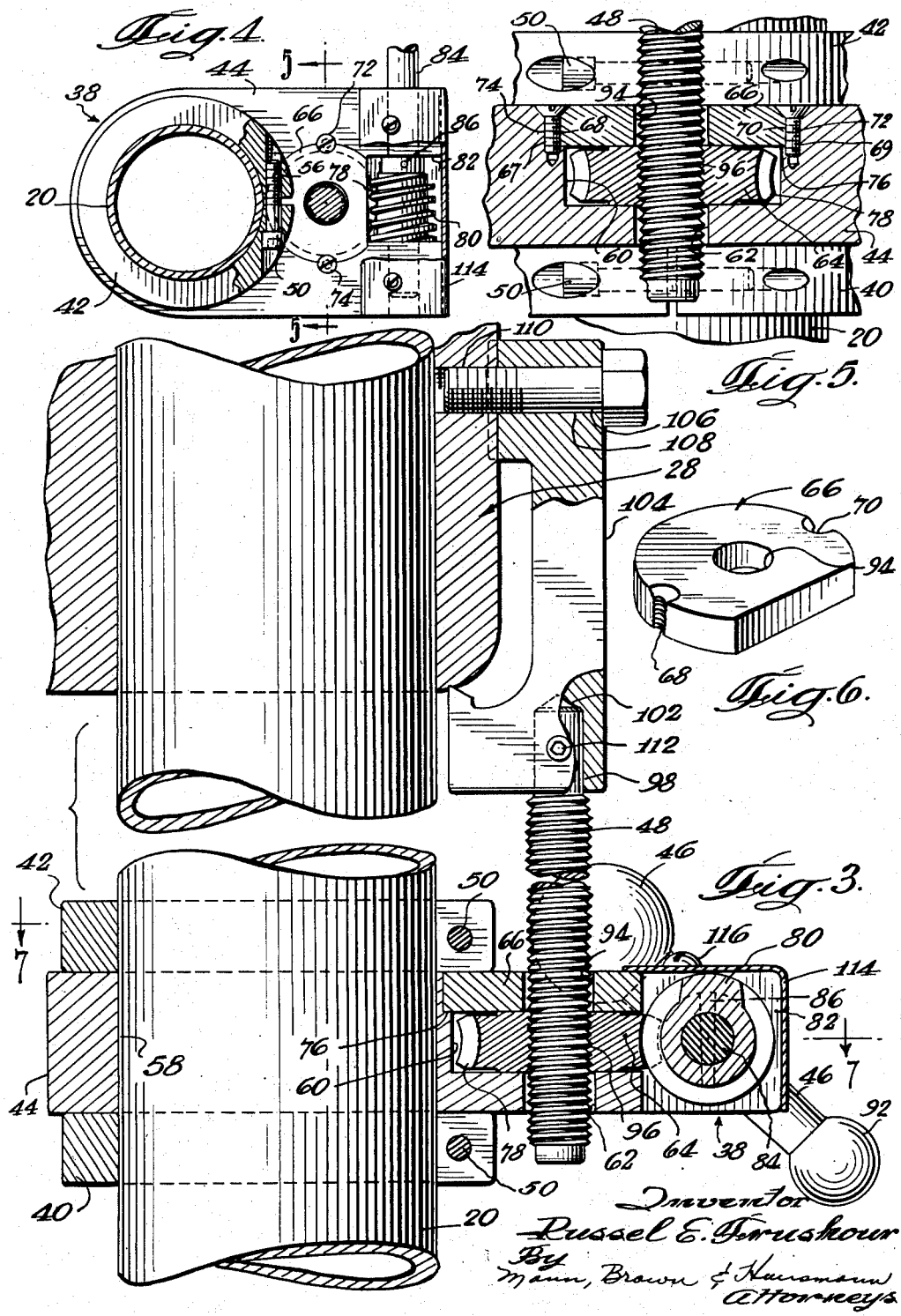

May 19, 1953　　　　　R. E. FRUSHOUR　　　　2,638,800
TABLE OR HEAD POSITIONING ATTACHMENT
FOR DRILL PRESSES AND THE LIKE
Filed May 19, 1951　　　　　　　　　　　　　3 Sheets—Sheet 3
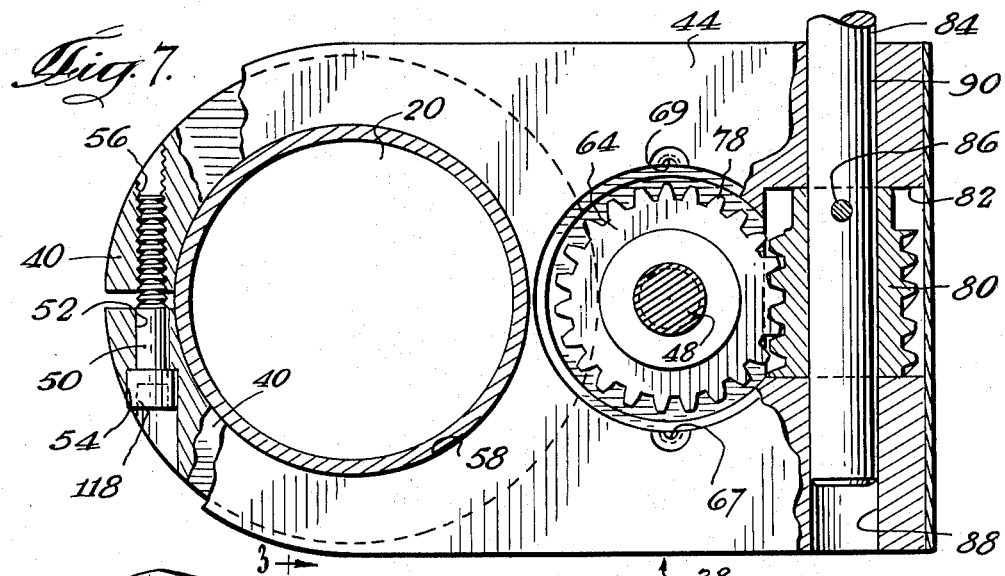
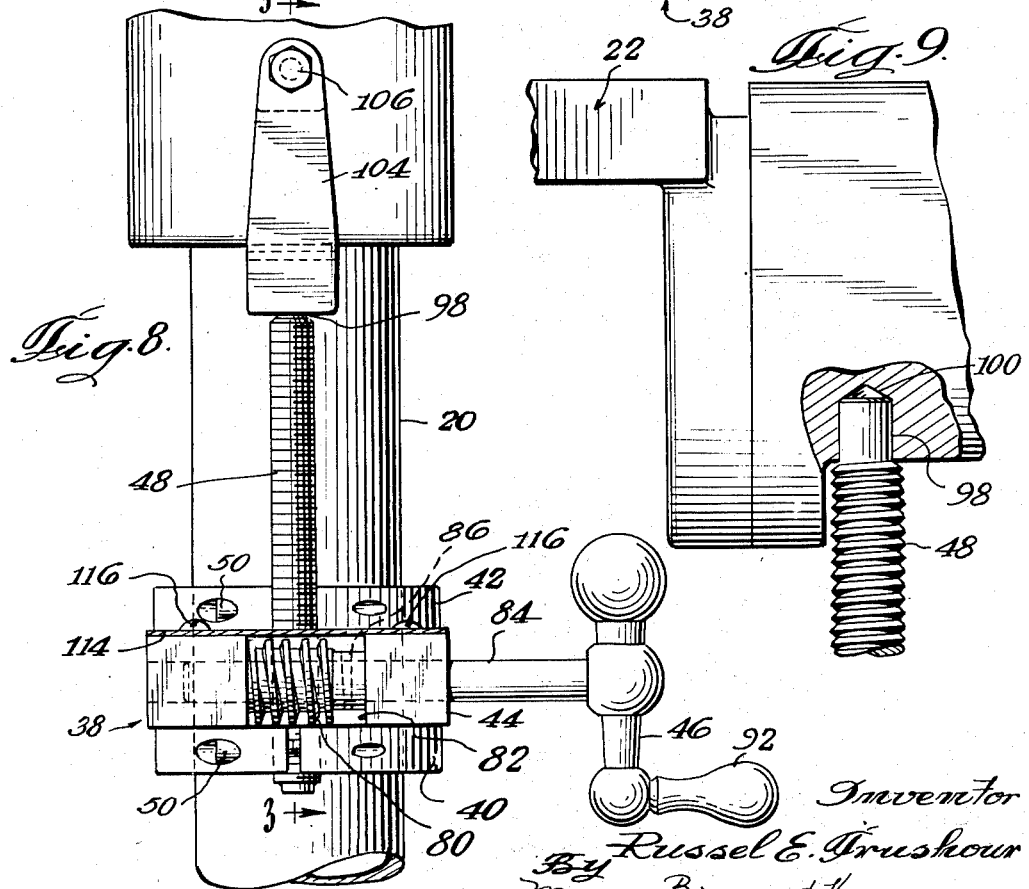
Inventor
Russel E. Frushour
By Mann, Brown & Hausmann
Attorneys Patented May 19, 1953

2,638,800

UNITED STATES PATENT OFFICE 2,638,800

TABLE OR HEAD POSITIONING ATTACHMENT FOR DRILL PRESSES AND THE LIKE

Russel E. Frushour, South Bend, Ind., assignor to South Bend Lathe Works, South Bend, Ind., a corporation of Indiana Application May 19, 1951, Serial No. 227,173

3 Claims. (Cl. 77—5)

My invention relates to table or head positioning attachments for drill presses and the like. While the table or head positioning attachment illustrated and described herein is particularly useful with drill presses, my invention is not limited to such use but is adapted to be used with various other types of machines in which a component of the machine is to be variously positioned along a shaft or mast.

In practically all drill presses a vertical column is attached to a base which is to set on either the floor or a table, and a work table is slidably mounted on the column to support the work on which the drilling is to be done. Positioned above the table on the column, and slidably attached to the column, is the drill press head. The drill press head and work table are also rotatable about the column.

In using a drill press in the various types of drilling, tapping, mortising, reaming, and other operations, it is often necessary to move either of the machine components, namely, the head or the work table, or both, either axially along the column or rotatably about the column. In the past, this moving of the table or head has been accomplished by releasing the locking means holding the table or head on the column and moving them by hand.

The table and head are relatively heavy elements so that it is difficult to set the table or head in any exact position.

Another difficult operation to accomplish with this type of table and head is to rotate one or the other, or both, about the column without changing the vertical placement of the table or head.

Accordingly, the objects of my invention are:

To provide a machine component positioning attachment that is inexpensive, rugged, and easily assembled;

To provide a machine component positioning attachment that may be secured in any position on a shaft and locked in that position;

To provide a machine component positioning attachment that will enable an operator easily to move the component to any desired position along a mast or shaft;

To provide a machine component positioning attachment that will enable an operator to rotate the component about a column or shaft without changing its position along the column or shaft; and To provide a work table or drill press head positioning attachment to operate in conjunction with the depth gauge of a drill press to give the operator greater versatility in controlling feed depth, and the spindle position relative to the work.

These and other objects and advantages will become apparent as the disclosure proceeds, and the description is read in conjunction with the accompanying drawings, in which:

Fig. 1 is a partial side elevational view of a drill press embodying my invention;

Fig. 2 is a horizontal sectional view taken on line 2—2 of Fig. 1;

Fig. 3 is a detail vertical view partially in section taken on line 3—3 of Fig. 8;

Fig. 4 is a detail horizontal view taken on line 4—4 of Fig. 1, with some of the parts broken away;

Fig. 5 is a detail vertical view taken on line 5—5 of Fig. 4;

Fig. 6 is a perspective view of the thrust plate;

Fig. 7 is a view similar to Fig. 4, but showing in more detail the worm and gear of the positioning attachment and with the upper split collar removed;

Fig. 8 is a view of the head positioning attachment taken from the right-hand side of Fig. 1 with the guard broken away to expose the worm; and Fig. 9 is a detail view of the table and screw of the table positioning attachment, with part of the table broken away.

Fig. 1 shows a conventional drill press having a column 20, a work table 22 secured on the column by means of a screw clamp 24, controlled by a handle 26, a drill press head, generally designated 28, secured on the column by a stud 30, a chuck 32 and a drill 34. The work piece 36 is shown bolted to the table 22 in position to be drilled. The screw clamp 24 and stud 30 are adapted to lock the table and head, respectively, on the column 20, and when loosened permit the table and head to be moved axially along the column and rotated about the column.

My positioning attachment, generally designated 38, is shown in Fig. 1 as associated with both the work table 22 and the head 28, and consists generally of a lower split collar 40, an upper split collar 42, a base 44, a ball crank 46, and a screw 48.

The split collars 40 and 42 are secured to the column 20 by means of machine screws 50. Referring to Fig. 7, it will be seen that one side of the collar 40 has a bore 52 and a counterbore 54 while the other side of the collar has a threaded bore 56. The machine screw 50 is inserted through the bore 52 and threaded into the bore 56 and tightened to compress the split collar 42 and secure it to the column 20. Split collar 42 is identical to split collar 40 and is secured to the column in exactly the same manner.

The base 44 positioned between the split collars 40 and 42 has an opening 58, of a diameter slightly greater than that of column 20, through which the column passes. As indicated in phantom in Fig. 2, the base 44 is free to rotate about the shaft 20 between the collars 40 and 42.

Referring to Figs. 3, 4 and 5, it will be noted that the base 44 has been cut away to form a cylindrical cavity 60, and has a passage 62 opening into cavity 60 through which the screw 48 may pass. An internally threaded gear 64 is inserted within the cavity 60 and retained therein by a thrust plate 66 having half-threaded bores 68 and 70 aligned with corresponding half-threaded bores 67 and 69 provided by base 44. Screws 72 and 74 are inserted in bores formed by half-bores 69 and 70 and half-bores 67 and 68, respectively, to hold the thrust plate firmly against flange 76 formed in the cavity 60 of base 44.

The gear 64 has teeth 78 formed on its periphery and these teeth are adapted to engage a worm 80. The worm 80 is held within an elongated cavity 82 in the base 44 by a shaft 84 and is secured to the shaft 84 by means of a pin 86. The length of worm 80 is substantially the same as the length of cavity 82 to prevent misalignment of the worm 80 and teeth 78 of gear 64. The shaft 84 is journaled at one end in a bore 88 formed in one side of the base 44 and in a bore 90 formed in the other side of the base 44. The shaft 84 extends through the bore 90 and has fixedly attached to its end a ball crank 46. A handle 92 is secured on one end of the ball crank 46 to facilitate rotation of the ball crank 46 and shaft 84. Hence, it will be seen that as the ball crank 46 is rotated the worm 80 will transmit rotation to the gear 64.

The screw 48 engages the internal threads of gear 64 in alignment with the bore 62 in the base 44. The thrust plate 66 has an unthreaded bore 94 aligned with the internal threads 96 of gear 64 to permit the screw 48 to freely pass through the thrust plate 66.

At its upper end the screw 48 has a reduced unthreaded portion 98 which is adapted to engage the machine component that is to be moved.

Fig. 9 shows a portion of the work table 22 and its mounting on screw 48. It will be seen that the reduced portion 98 of screw 48 is located within a recess 100 formed in the table 22 to support table 22 and frictionally engage the table so that rotation of the screw 48 is prevented.

Referring particularly to Fig. 3, the reduced portion 98 of the screw 48 is received within a recess 102 of a bracket 104. The bracket 104 is secured to the head 28 by means of a bolt 106 passing through a bore 108 in the bracket 104 and engaging a threaded bore 110 in the head 28. The bracket 104 provides a simple means of attaching the screw 48 to the head 28. In Fig. 3 I have shown the screw 48 secured to the bracket 104 by means of a pin 112.

In assembling the gearing on the base 44, the worm 80 is inserted into the elongated cavity 82 and the gear 64 is placed within the cavity 60 with the teeth of the worm and gear meshing. The shaft 84 is inserted through bore 90, the bore of the worm, and bore 88, and the pin 86 is inserted to secure the worm 80 to the shaft 84.

Then the thrust plate 66 is set into the cavity 60 to rest on the flange 76 and the screws 74 and 72 are screwed into the bore formed by half-bores 68 and 67 and the bore formed by half-bores 70 and 69, respectively, to secure the gear 64 within the base 44. It should be understood that the gear 64 is held against axial movement, but it is free to rotate. The screw 48 may then be fed through the gear 64 by rotating the screw 48 and holding the shaft 84.

In order to keep dirt, drill shavings and the like away from the worm 80 and the gear 64 a guard 114 is placed over the top and side of cavity 82 and secured to the base 44 by means of screws 116.

The positioning attachment is placed on the column 20 in the following manner. With the head and work table removed from the column, the slip ring 40 is lowered on the column until it reaches the position desired, and then it is secured to the column by tightening machine screw 50 by means of a wrench inserted in a socket 118 in the head of screw 50. The base 44 and gearing assembly are then lowered over the shaft 20 until the base 44 rests on the split collar 40. Split collar 42 is lowered on the column 20 and secured in the same manner as split collar 40. The work table 22 is lowered over the column 20 and the reduced portion 98 of screw 48 is guided into the hole 100 of the work table 22.

The positioning attachment for the head is next installed on the column 20 first by attaching the split collar 40 to the column in a suitable location, then by slipping the base 44 over the column and into engagement with the split ring 40. The base 44 is then locked in vertical position by applying the split collar 42 and locking it in position on the column so that the base 44 is free to rotate between the collars 40 and 42 but is held against longitudinal movement therebetween. The head 28 with bracket 104 attached thereto can then be placed on the upper end of the column 20 and positioned so that the upper end of screw 44 projects into cavity 102 in bracket 104. Pin 112 may then be inserted to lock the upper end of a screw 48 to this bracket.

In many instances it will not be necessary to provide a positioning attachment both for the work table 22 and the head 28 as a single positioning attachment for either the work table or the head will give sufficient vertical adjustment for many purposes.

When the split collars 40 and 42 are secured to the column 20 it should be noted that the base 44 and the parts connected thereto are free to pivot about the column 20. Hence, if it is desired to pivot the table 22 about the column 20 while retaining the table 22 in the same horizontal plane, it is only necessary to loosen screw clamp 24 by means of handle 26 and pivot the table 22 and the base 44 about the column 20. If a fixed position is desired the table 22 may be locked in that position by handle 26.

If it is desired to move the table 22 upwardly or downwardly, the ball crank 46 is rotated in the appropriate direction. Screw clamp 24 is, of course, loosened when the table is being moved.

Since the reduced portion 98 of screw 48 frictionally engages the hole 100 formed in the work table 22, it is possible to adjust the table without using the positioning attachment. Hence, (referring to Fig. 1) by loosening screw clamp 24, the table 22 can be lifted upwardly on the shaft 20 and re-locked by tightening screw clamp 24 without using the table positioning attachment.

The head 28 may be raised and lowered by my novel positioning attachment in the same way in which the table 22 is raised and lowered except that the head is attached to the screw 48 by pin 112 so that the head cannot be raised or lowered independently of the positioning attachment. The head also may be pivoted freely about column 20 while supported by the positioning attachment and may be firmly fixed in any desired position by tightening the stud 30 which clamps the head firmly to the column 20.

In Fig. 1 I have shown the table and head positioning attachments as being identical. It will be noted from Fig. 1 that such identical structure causes the ball cranks 46 of the table and head positioning attachments to be oppositely disposed on the column 20. It is advisable to form what may be termed a right-hand and left-hand positioning attachment so that the cranks 46 will be disposed on the same side of the drill press for both the table and head positioning attachments. In Fig. 2 I have indicated in phantom how such a left-hand positioning attachment could be made by simply extending the shaft 84 from the other side of the base 44.

From the foregoing it will be apparent that I have provided a simple machine component positioning attachment which provides a quick and convenient means for adjusting the position of a drill press head, work table, or the like. This attachment can be used at any point on the column and provides substantial vertical adjustment for any one setting. The enclosed gearing provides easy smooth operation. Also, the attachment readily permits pivoting the machine component in any horizontal plane without deviation therefrom.

It is to be understood that my invention is not limited to the details shown and described but may assume numerous forms and includes all variations, modifications, and equivalents coming within the scope of the appended claims.

I claim:

1. In a device for positioning a machine component along a shaft, first and second collars fixedly secured to said shaft, a base disposed between said collars, said collars preventing movement of said base axially along said shaft but permitting rotation about the shaft, a gear held on said base and free to rotate with respect to said base, a worm held on said base and free to rotate with respect to said base, said gear and worm being in meshed relationship, a screw threaded axially through said gear and having an end portion spaced from said gear, means connecting said end portion of said screw to said machine component, said machine component being supported on said shaft by said screw and said machine component and screw being moved axially of said shaft when said gear and worm are rotated, a second shaft carrying said worm, and a handle secured to said second shaft.

2. In a device for positioning a machine component along a shaft, first and second collars fixedly secured to said shaft, a base disposed between said collars, said collars preventing movement of said base axially along said shaft but permitting rotation about the shaft, a gear held on said base and free to rotate with respect to said base, a worm held on said base and free to rotate with respect to said base, said gear and worm being in meshed relationship, a screw threaded axially through said gear, a reduced end on said screw, said machine component having a recess in which said reduced end of said screw is disposed, said machine component being supported on said shaft by said screw and said machine component and screw being moved axially of said shaft when said gear and worm are rotated, a second shaft carrying said worm, and a handle secured to said second shaft.

3. In a device for positioning a machine component along a shaft, first and second collars fixedly secured to said shaft, a base disposed between said collars, said collars preventing movement of said base axially along said shaft but permitting rotation about the shaft, a gear held on said base and free to rotate with respect to said base, a worm held on said base and free to rotate with respect to said base, said gear and worm being in meshed relationship, a screw threaded axially through said gear, a reduced end on said screw, a bracket secured to said machine component and having a recess adapted to receive said reduced end of said screw, means for securing said reduced end of said screw in said recess, said machine component being supported on said shaft by said screw and said machine component and screw being moved axially of said shaft when said gear and worm are rotated, a second shaft carrying said worm, and a handle secured to said second shaft.

RUSSEL E. FRUSHOUR.

References Cited in the file of this patent

UNITED STATES PATENTS

| Number | Name | Date |
| --- | --- | --- |
| 1,249,379 | Goldsmith | Dec. 11, 1917 |
| 2,122,966 | Tautz | July 5, 1938 |
| 2,260,635 | Musselman | Oct. 28, 1941 |
| 2,392,070 | Snyder | Jan. 1, 1946 |